United States Patent [19]

Vincent

[11] Patent Number: 4,499,382

[45] Date of Patent: Feb. 12, 1985

[54] INFRARED SOURCE ELEMENT

[75] Inventor: Kent D. Vincent, Cupertino, Calif.

[73] Assignee: Hewlett-Packard Company, Palo Alto, Calif.

[21] Appl. No.: 434,817

[22] Filed: Oct. 18, 1982

[51] Int. Cl.³ .................................................. G21G 4/00
[52] U.S. Cl. .............................. 250/493.1; 250/504 R
[58] Field of Search .................. 250/493.1, 494.1, 504; 219/546, 553

[56] References Cited

U.S. PATENT DOCUMENTS

| 3,138,697 | 6/1964 | Banca et al. | 250/493.1 |
| 3,602,693 | 8/1971 | Grounner | 219/553 |
| 3,841,920 | 10/1974 | Martin | 219/553 |
| 4,317,042 | 2/1982 | Bartell | 250/493.1 |

Primary Examiner—Bruce C. Anderson
Attorney, Agent, or Firm—Jeffery B. Fromm

[57] ABSTRACT

A novel structure for a small, inexpensive, and easily replaced infrared source having near blackbody emission over a spectrum of 2-20 micron wavelengths is disclosed. The source element is self-starting and has a life expectancy in excess of 1000 hours at 1700 degrees K, which requires only 22 watts of power to maintain. Because the source is energy efficient, there is no need of auxilliary cooling or added thermal isolation from adjacent components when the source is used in an instrument such as a spectrophotometer.

3 Claims, 2 Drawing Figures

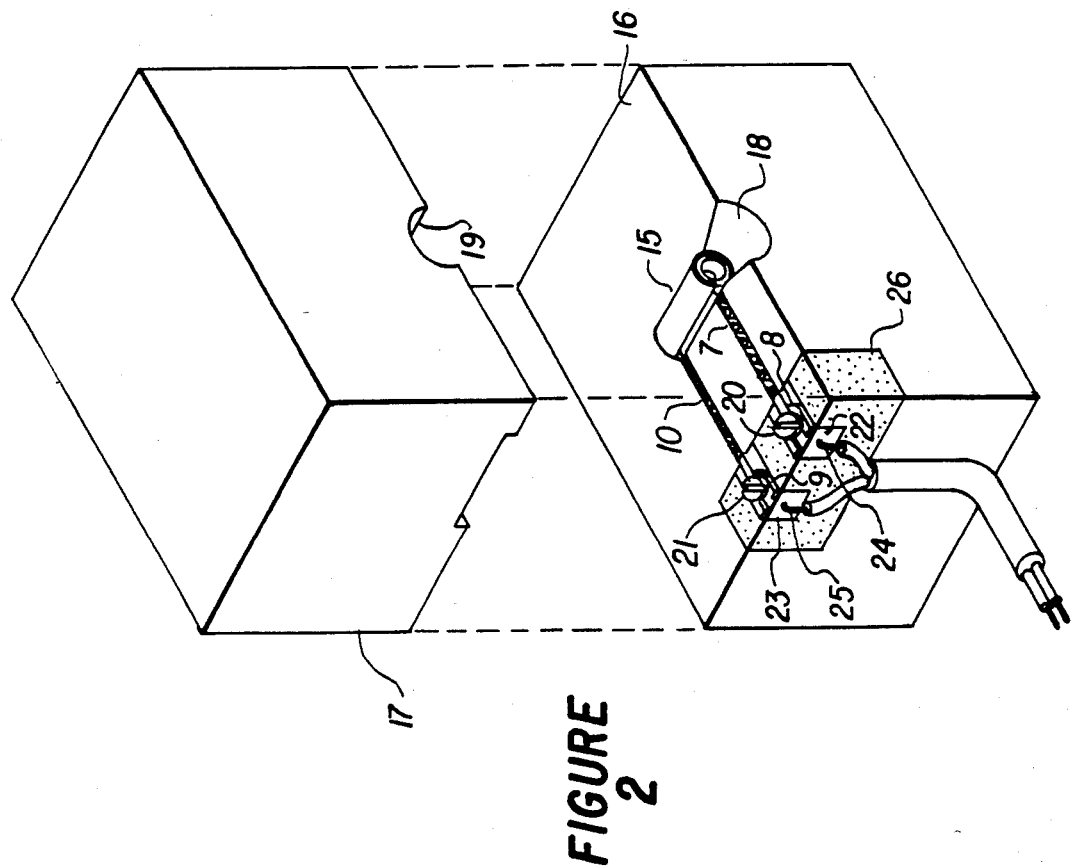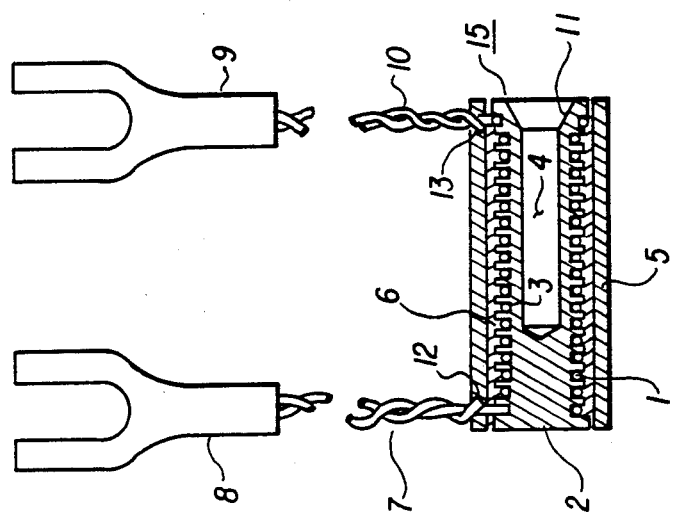

INFRARED SOURCE ELEMENT

BACKGROUND OF THE INVENTION

A particular application of infrared sources is in an infrared spectrophotometer, an instrument which measures the relative absorption spectra of chemical compounds. In such a system infrared radiation is collected optically from an infrared source and focused onto a cell containing a chemical sample. The sample characteristically absorbs selected wavelengths of the incident radiation. Transmitted wavelengths pass through the sample cell and are focused onto a photoelectric detector which produces an electrical output relative to the intensity of transmitted radiation. The sensitivity of a spectrophotometer is ultimately dependent upon the sensitivity of the detector, the intensity of radiation emitted by the source at each wavelength and the ability to efficiently focus the radiant energy through the sample cell and to the detector.

Several factors affect the desirability of an infrared spectrophotometer source. In addition to high infrared flux, it is highly desirable that the source be stable, reach equilibrium in a short period of time, and not thermally or chemically pollute the inner environment of the spectrophotometer. It is further desirable that the source have a life expectancy of at least 1000 hours at normal operating conditions, and when expired be easily and inexpensively replaced. Further, the source should be of relatively small size to provide optimum spacing between adjoining and optically coupled components in the spectrophotometer.

Commercial blackbody sources, although providing 99+% of the maximum Plankian infrared flux at all wavelengths for a given temperature and with optimum stability, have not been accepted as sources for spectrophotometers due to their excessive size and cost. These devices are standards for radiometry and photometry and consist of a variety of well insulated, precisely heated blackbody cavities, each integrally encased, as a stand alone instrument and not readily or inexpensively renewed.

In the prior infrared spectroscopy art, sources have been limited to a small number of incandescent non-gaseous elements: Nernst glowers, wire wound ceramic glowers, silicon carbide rods and metallic ribbon filaments. When heated, these elements emit radiation according to well known Plankian spectral distribution having intensity proportional to the absolute temperature and spectral emissivity of the radiating surface at each wavelength. These devices are small, inexpensive, readily replaced, and temperature equilibrate quickly. Unfortunately, the refractory materials which are used to construct these devices and are suitable for use at high temperatures have relatively poor spectral emissivities which usually decrease with increasing temperature, and, likewise, those materials with uniformly high spectral emissivities are limited to relatively low temperatures.

Nernst glowers are constructed from rod or tubes of refractory ceramics, usually zirconia and to a lesser extent yttria and thoria. Platinum leads located near the ends of each element conduct power through the ceramic, heating it to temperatures up to 2000 degrees K. Nernst glowers suffer from several short comings. First, they are not self-starting and require some means of auxillary heating to lower their high electrical resistance at room temperature. Second, as with most rod heaters, these elements are substantially power inefficient since the entire outer diameter of the rod radiates energy and usually only a small area on one outer segment of the rod is usable for focusing. The rods are also relatively long since they are supported and electrically connected through their ends. Third, these elements have relatively poor spectral emissivities, averaging about 0.75 over the spectrographically useful range of 2-20 micron wavelength, and as low as 0.15-0.30 at 3 micron.

Wire wound ceramic glowers overcome the self-starting deficiency of Nerst glowers. These elements are comprised of a ceramic rod externally wound or a ceramic tube internally wound with a precious metal wire, usually platinum or a platinum alloy, which serves to heat the ceramic. The windings are secured by a ceramic powder which is sintered to the base element. In each case the ceramic is the radiating surface, usually alumina or zirconia, and as such the wire wound ceramic glowers exhibit the same poor short wavelength characteristics as the Nernst glowers, and are effectively as power inefficient since they too are heated rods which radiate along the length of their outer diameters.

Perhaps the most commonly used infrared spectrophotometer source is the silicon carbide rod, commercialized by the Union Carbide Corp. under the tradename Globar. The Globar is a rod of bonded silicon carbide capped with metallic electrodes, usually silver, which serve to pass current through the Globar to heat it. The Globar is self-starting and has a spectral emittance which is relatively uniform and averages 0.89 from 2-15 micron wavelength, with only a narrow emittance loss to about 0.6 at 12 microns. The primary shortcoming of the Globar is its temperature limitation in air of about 1570 degrees K. It is also necessary to cool its end caps, usually with water, adding unwanted bulk and cost to the spectrophotometer. And, like other rod sources, the Globar is appreciably power inefficient.

Some recent interest has surfaced in the use of metallic ribbon filament sources. An alloy mixture of 80% nickel and 20% chromium has a relatively high spectral emissivity, approximately 0.91 over the range of 2-15 micron wavelength when oxidized and measured at 1400 degrees K. The nickel chromium alloy also has favorable electrical resistance for heating, is inexpensive, and easily replaced. The metallic ribbon filament is limited to temperatures of about 1400 degrees K., however, and has relatively poor longevity at this temperature in air, less than 1000 hours.

As is readily aparent, from the prior art, current spectrophotometer sources all suffer from undesirable restrictions on infrared flux, either temperature limitations or poor emissivity characteristics. The net effect on spectroscopy is less than optimum spectral sensitivity. These sources also impose undesirable thermal dissipation into their host instruments, usually requiring added expense and added instrument size associated with auxillary cooling and the need to physically isolate the source structure from the many temperature sensitive components in a spectrophotometer. Commercial blackbody sources, being laboratory instruments, have been incompatible with the size, cost and replaceability needs of spectrophotometer infrared sources.

SUMMARY OF THE INVENTION

It is an object of the present invention to provide a 2000 degrees K. infrared source having near blackbody emission over a spectrum of 2-20 micron wavelengths.

It is a primary object of the present invention to provide the blackbody source as an inexpensive, simple, small, and easily replaceable source element.

It is a further object of the present invention that the source element be self starting and have a life expectancy in excess of 1000 continuous hours at 1700 degrees K. in normal atmosphere.

It is yet a further object of the present invention that the source element be self-locating upon installation.

It is yet a further object of the present invention that the source be energy efficient, and create no need for cooling or significant isolation when used in a spectrophotometer.

In a preferred embodiment of this invention a high temperature precious metal alloy heating wire is wound about the outer diameter of a high temperature refractory ceramic core having machined at one end along its central axis a blackbody cavity, e.g., a cylindrical blind hole. Concentric to this cavity and encasing the heater windings a ceramic sleeve is secured in place over the core and windings through a sintered ceramic cement. The thusly constructed element can be nested in mating blocks of low thermal conductivity refractory insulation, the concentric sleeve serving to locate the blackbody cavity accurately in the insulating block. Heater winding leads emitting from the ceramic sleeve of the element are connected to a suitable power source which controllably heats the ceramic core through the windings to the desired temperature. A hole in the insulating block allows axial radiation from the blackbody cavity to pass directly out of the insulation. Energy dissipation from the heated element is otherwise transferred through the high thermal resistance insulation by conduction providing relative high energy efficiency and low heat loss into the surrounding environment in which the source is located.

BRIEF DESCRIPTION OF THE DRAWINGS

FIG. 1 is a cross-sectional view of the source element according to the present invention.

FIG. 2 is an isometric view of the source element nested in insulation blocks, one block removed, also showing electrical connection.

DESCRIPTION OF THE PREFERRED EMBODIMENT

The present invention is designed on the premise that the relatively poor emissivity characteristics of refractory materials at high temperature can be sufficiently overcome by the inclusion of a radiation cavity through which an apparent emissivity approaching that of a blackbody can be realized at all wavelengths of interest. Secondly, the efficiency of a source can greatly be increased by thermally insulating all surfaces of the heated source element other than the radiation cavity, thus eliminating the primary sources of power loss at high temperatures, radiation and convection.

In FIG. 1, a cross-sectional view of the preferred source element according to this invention is shown. The source element 15 consists of a circular ceramic rod 2 having furnace wire 1 radially wound about the length of its outer diameter. To maintain even heating distribution from the wire and assure that no windings are shorted together, furnace wire 1 is preferably wound in equally spaced grooves 3 machined or cast about the outer diameter of ceramic rod 2. A radiation cavity 4 is machined or cast into one end of ceramic rod 2 along the central axis of the rod and concentric to windings 1. The radiation cavity 4 is preferably a drilled blind hole. In operation, furnace wire 1 is electrically connected to a power source which provides for the heating of the windings 1 and consequently the heating of ceramic rod 2. The exposed ends of ceramic rod 2 will be somewhat cooler than its mid-section when heated. To maintain uniform heating along the length of cavity 4, as is important to the successful performance of the cavity, the length of cavity 4 is chosen such that its bottom remains within the uniformly heated length of ceramic rod 2. Similarly, the opening of cavity 4 has machined therein a conical opening 11, the intersection of said cone 11 and cavity 4 being within the uniformly heated length of ceramic rod 2, said intersection also becoming the aperture of the cavity 4. The angle of conical opening 11 is selected to not significantly interfere with the radiant flux eminating from cavity 4.

Suitable materials for ceramic rod 2 include but are not limited to high temperature metallic oxide refractories, such as alumina, beryillia, magnesium oxide, and zirconia, all having melting points in exces of 2250 degrees K., and all stable at high temperatures in air. Suitable materials for furnace wire 1 include but are not limited to platinum, rhodium, iridium, and alloys thereof. Pure platinum can be employed up to temperatures of about 1950 degrees K., alloys of platinum and rhodium allow winding temperatures near 2100 degrees K. Pure rhodium and pure iridium and their alloys can be used at even higher temperatures. They are less ductile and harder to wind, however.

The free ends of wound furnace wire 1 also serve as electrical leads 7 and 10 which eminate from ceramic core 2. Each free end is preferably cut to approximately twice the desired length and then doubled over on itself and twisted. The twisting reduces the electrical resistance of each lead such that the lead temperatures will be substantially cooler than the windings. This measure provides greater protection and greater life for the leads as shall become apparent. Spade connectors 8 and 9 are crimped and soldered over the folded ends of each lead 7 and 10, respectively, thus providing a means for easy connection and disconnection of the source element 15 from its power source, not shown. The spade connectors are chosen to allow low terminal resistance when connected. Such connectors are well known to those skilled in the art of electronics and shall not be further dealt with in this specification.

Grooves 3 in ceramic rod 2 are preferably arranged such that the outer diameter of the winding coil 1 is less than the outer diameter of ceramic rod 2. In the annulus formed between these two diameters, and surrounding the exposed surface of each winding 1, a high purity refractory cement 6 is trowelled. This winding encapsulation serves a dual purpose. First it protects the windings from scratches and other surface imperfections which lead to premature winding failure. Second, the encapsulation retards evaporation of the furnace wire at high temperatures, and hence prolongs the life of the windings. Both the ceramic rod 2 and the refractory cement 6 should be selected from materials of highest purity. Impurities such as iron and silicon organometallics can break down at high temperatures allowing the metal fractions to alloy with the furnace winding leading to early failure of the source. A preferred refractory cement 6 consists of slurry of powdered ceramic in deionized water. Once trowelled and water removed, the powdered ceramic is sintered at high temperature to a hard, well-bonded encapsulant. One example of such a cement is a high purity alumina marketed as EA 139 by Norton Company, Worchester, Mass.

The thusly trowelled and sintered surface of refractory cement 6 usually does not form an easily smoothed or even surface, important for proper alignment of the source when assembled into an instrument. To overcome this difficulty a thin walled ceramic sleeve 5 is slid over the outer diameter of ceramic rod 2 prior to the sintering of refractory cement 6. Ceramic sleeve 5 is preferrably made of the same refractory material as ceramic rod 2. The inner diameter of ceramic sleeve 5 is nominally that of the outer diameter of ceramic rod 2 to maintain concentricity between the central axis of cavity 4 and the outer diameter of ceramic sleeve 5. A lengthwise slot, through one wall of ceramic sleeve 5, not shown in FIG. 1, allows the sleeve to be slid over protruding leads 7 and 10. During assembly leads 7 and 10 are aligned to be parallel and lie in a single plane which bisects the source along its central axis. The ends of each lead 12 and 13 are cut such that leads 7 and 10 do not short to the adjacent windings 1 yet the ends are well within the outer diameter of ceramic sleeve 5. The sleeve is positioned over ceramic rod 2 and windings 1 while the refractory cement 6 is still wet. The slot in ceramic sleeve 5 is also filled with cement and trowelled to meet the outer diameter of the sleeve while fully encapsulating the lead ends 12 and 13. All excess cement is removed prior to sintering. Sintering can be accomplished by furnace heating or simply by heating the source through its own windings. In either case the rate of the temperature rise during sintering must be carefully controlled to prevent stress cracking of the unsintered brittle ceramic powder.

Methods for calculating apparent emissivity for various cavity shapes, such as the method of Gouffe, are well known and can be readily found in standard optical and infrared handbooks. The depth of the radiation cavity, and hence the length of the source element 15, can be quite small and still produce high apparent emissivities for materials having relatively low normal spectral emissivities. For example, zirconia, a material having a melting point of 3250 degrees K., has an emissivity of approximately 0.15 at high temperatures at 3 micron wavelength. The apparent emissivity of zirconia at 3 micron can be raised to approximately 0.85 through a cylindrical cavity measuring 1.5 mm diameter by only 10 mm deep. The same cavity at 6 micron wave length where zirconia has a normal spectral emissivity of approximately 0.4 will produce radiation at the cavity aperture with an apparent emissivity of about 0.97. It is obvious that practical source element designs according to this invention can produce major improvements in radiant flux over prior art spectroscopic source elements.

Selection of wire gauge for the source element windings should be based on electrical resistance, cost, energy consumption, and longevity. In general, the life of furnace wire is proportional to its cross-sectional area, and decreases with increasing temperature and power loading. As a rule, winding wire should not be subjected to over twelve watts per $cm^2$ of wire surface area; four or less watts per $cm^2$ is a preferred operating point for maximum longevity. For most source designs 27 gauge wire will provide adequate life at relatively low cost.

The above-described source element 15 comprises the renewable entity of the source apparatus. Since the only useable energy emitted by the source element is through radiation cavity 4 all external surfaces of the source element are preferably insulated from energy loss to limit heat exchange of the source element with its environment, e.g., a spectrophotometer, and to minimize the power required to heat furnace windings 1, thus prolonging the life of the source element. The preferred method to insulate source element 15, shown in FIG. 2, also serves to nest the source element for easy replacement and to align the axis of radiation cavity 4 with the adjoining optics of the host instrument.

FIG. 2 is an isometric view of a source assembly according to this invention. Source element 15 is preferrably nested between two adjoining insulation blocks, 16 and 17, composed of refractory materials and having very low thermal conductivity. Ceramic fibre insulation is particularly suitable for this application, a good example being an alumina fibre block marketed as WRP-XA by Refractory Products Company, Elgin, Ill. Each insulating block has machined on its mating surfaces the half contour of source element 15, i.e., half cylinder recesses to captivate the source element body and grooves to captivate its leads 7 and 10. The contours are precisely dimensioned such that when the assembly of insulating blocks 16 and 17 is secured into its host instrument, e.g., a spectrophotometer, the nested source element 15 will properly align with the optics of the host instrument. Adjoining the half cylinder recesses in blocks 16 and 17 are half cone recesses 18 and 19, respectively. When source element 15 is properly nested, and insulating blocks 16 and 17 are mated together, half cylinder recesses 18 and 19 will form a conical extension of conical opening 11 at the cavity end of source element 15. In this manner, insulating blocks 16 and 17 will not significantly interfere with radiation eminating from cavity 4 in source element 15. The half cylinders and half cones can readily be machined by drilling and countersinking into the intersection of insulating blocks 16 and 17 while clamped together.

Electrical connection to source element 15 is preferrably made through a terminal strip located at one end of one insulating block. In FIG. 2 a terminal block 26, made of ceramic such as alumina, or other electrical insulation material, is made to fit and is secured into a rectangular section of insulating block 16 at one end directly adjacent to source element 15 and in line with its electrical leads 7 and 10. Two rectangular solid blocks of metal, preferably copper or brass, are secured and separated by rectangular grooves machined into terminal block 26. Said metal blocks form electrical terminal connectors 22 and 23. Spade connectors 8 and 9 of sample element 15 are secured to the terminal connectors 22 and 23, respectively, through fastening screws 20 and 21, respectively, threaded into the terminal connectors. Power supply electrical leads 24 and 25 are inserted through drilled holes in terminal connectors 22 and 23, respectively, and soldered in place. The power supply leads 24 and 25 are also connected to the power supply, not shown, which controls the amount of electrical power which flows across the source element windings.

As is now apparent, source element 15 can be easily removed and replaced with the simple nesting and terminal connection techniques described above. Insulating block 16 is preferably anchored to the host instrument in proper alignment to its optics while insulating block 17 is clamped to insulating block 16 through removable bolts passing through both blocks, not shown, or other suitable means. To install source element 15, insulating block 17 is simply unclamped from insulation block 16, fastening screws 20 and 21 loosened and the expired source element is removed; the new source element 15 is then nested in the contoured recesses of insulating block 16, sliding lug connectors 8 and 9 under fastening screws 20 and 21, respectively, and tightening same; the recessed contours of insulating block 17 are then oriented over the exposed surfaces of the nested source element 15 and insulating blocks 16 and 17 reclamped as previously described.

In operation, electric current from the controlling power supply, not shown, is caused to pass through leads 7 and 10 and windings 1 in source element 15, heating the windings in proportion to the product of the current squared and electrical resistance of the windings and to the thermal resistance of insulating blocks 16 and 17. The hot windings uniformly heat radiation cavity 4 such that radiation approaching blackbody radiation is emitted from its aperture. As the windings rise in temperature, so does its electrical resistance. The electrical resistance forms an acceptable form of feedback for controlling the source temperature at the controlling power supply. Insulating blocks 16 and 17 restrict the flow of heat from the outer surfaces of source element 15 from dissipating into and hence heating the host instrument.

The characteristics of a typical source element 15 of this invention shall now be given by way of example. A 99.8% pure alumina rod produced by Coors Ceramics, Golden, Colo., was ground to 4.75 mm diameter and cut to 13.75 mm in length. A hole measuring 1.57 mm diameter by 9.14 mm deep was drilled from one end along the central axis of the rod. The depth was measured to the end of a 60 degrees drill tip. The hole was then counter sunk at 60 degrees to produce a cone at the end of the hole intersecting the hole 1.27 mm from the drilled rod end. The thus formed countersunk hole comprised the radiation cavity 4 and conical opening 11 of the source element 15.

A series of eighteen radial grooves were equally spaced along the length of the alumina rod symmetrical to the ends, and measured 2.62 mm inner diameter for seventeen grooves, 3.30 mm inner diameter for the eighteenth groove, and all having a 3.81 mm outer diameter. The eighteenth groove was located over the countersink of the radiation cavity. Each groove was 0.406 mm in width and the spacing was 0.71 mm, and comprised grooves 3 of the source element 15. A 27 gauge furnace wire composed of an alloy of 20% rhodium–80% platinum, manufactured by Englehard Industries, Carteret, N.J., was tightly wound in the eighteen grooves leaving 90 mm free length at each end. A lengthwise groove measuring 1.57 mm in width and bottoming on the 2.62 mm inner diameter of the grooves was prior machined into the alumina rod on one side to provide spacing for the furnace wire to cross over from one groove to the next. Each of the two free wire ends were doubled over and twisted to form leads 7 and 10.

A 99.8% pure alumina tube produced by Coors Ceramics, Golden, Colo., was ground to an outer diameter of 5.79 mm and an inner diameter of 4.77 mm. Along the length of one side a 1.19 mm slot was cut through the wall. The tube formed ceramic sleeve 5 of source element 15.

A refractory cement 6 comprising a 99% purity alumina powder manufactured as EA 139 by Norton Company, Worcester, Mass., admixed with deionized water to form a mortar was trowelled over all windings and grooves to a diameter of at least 4.75 mm about the alumina rod 2. While the cement was still wet the above described alumina ceramic sleeve 5 was slid over the cement and rod as described previously. With all excess cement removed, the thus formed source element was allowed to dry at room temperature for one hour.

Insulating blocks 16 and 17 were cut from blocks of alumina fibre insulation marketed as WRP-A5 by Refractory Products, Elgin, Ill. This material has a thermal conductivity of approximately $2.6 \times 10^{-4}$ cal/cm sec degrees C. at 1025 degrees K. Each block measured 64.8 mm in length, 43.2 mm front to back and 35.7 mm high. Nesting contours for source element 15 were machined into both blocks to allow the cavity end of the source element to be located 8.1 mm from the front face of each insulating block and on a central line along their length.

The above described source element was nested in the insulating blocks and connected to a power source for self-sintering. The source element temperature was raised slowly and uniformly to 1875 degrees K. over a period of 6.5 hours and held there for 30 minutes. At these temperatures the alumina powder sintered rendering the source element strong and its inner windings well sealed. The color temperature of the source cavity was measured with a Model No. 95 pyrometer manufactured by Pyrometer Instrument Company, Northvale, N.J.

The 1.57 mm diameter $\times$ 7.6 mm deep radiation cavity in the alumina source element of this example provides apparent emissivities exceeding 0.95 at all wavelengths between 2 and 20 micron wavelength and averaging in excess of 0.99 over the same range. This compares to normal spectral emissivities as low as 0.4 and averaging less than 0.78 over the same range for a plain alumina surface radiating at the same temperature.

The power requirement for the nested source element of this invention has been measured at 22 watts for 1700 degrees K. and 31 watts for 2000 degrees K. cavity color temperature. This compares to 60 watts for a 3.18 mm diameter $\times$ 25 mm long Nernst glower operating at 2000 degrees K. In addition, the source element of this example has operated continuously at 1700 degrees K. in excess of 1000 hours without failure.

As is obvious by the example given herewith and the specifications of the prior art, the source element of this invention can provide for both greater infrared flux at all wavelengths and greater energy efficiency than prior art spectrophotometric sources. Although the present invention has been described in terms of a particular embodiment, clearly other embodiments using design parameters appropriate to particular kinds of radiation source applications will be readily apparent to those skilled in the art. Thus, the above disclosure is to be construed as illustrative rather than limiting; and the scope of this invention is defined by the following claims.

I claim:

1. An infrared source comprising as source element having:
   an elongated rod composed substantially of refractory ceramic material, said elongated rod having an outer diameter OD and a plurality of circumferential grooves of depth d in the outer diameter;

a radiation cavity in the elongated rod oriented axially with respect to the elongated rod and opening on an end of the elongated rod;

a heater wire with cross sectional diameter w less than or equal to depth d of the circumferential grooves for substantially uniformly heating a length L of the elongated rod, said heater wire wound around the outside of the elongated rod in the plurality of circumferential grooves and positioned to maintain the bottom of the radiation cavity within the substantially uniformly heated length L of the elongated rod, with adjacent coils of said heater wire separated by the plurality of circumferential grooves;

an electrically non-conductive outer sheath of inner diameter ID substantially equal to the outer diameter OD of the elongated rod, said outer sheath precisely and concentrically covering the elongated rod; and sintered ceramic cement interposed between the elongated rod and the outer sheath encapsulating substantially all of the heater wire wound around the outside of the elongated rod in the plurality of circumferential grooves so that said outer sheath and said ceramic cement together encapsulate the heater wire to retard evaporation of said heater wire.

2. An infrared source as in claim 1 further comprising:

insulating means covering the outer sheath for thermally insulating and precisely positioning the source element;

a conical hole through the insulating means axially aligned with the radiation cavity in the elongated rod; and electrical connection means coupled to the heater wire for permitting replacement of the source element.

3. An infrared source as in claim 2 wherein the insulating means comprises two separable, adjoining insulating blocks having precisely dimensioned contours for aligning the source element with a desired orientation.

* * * * *